US008742900B2

(12) United States Patent
Burr

(10) Patent No.: US 8,742,900 B2
(45) Date of Patent: Jun. 3, 2014

(54) RFID ENABLED LIGHT SWITCHES

(75) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1352 days.

(21) Appl. No.: 11/967,950

(22) Filed: Dec. 31, 2007

(65) Prior Publication Data

US 2009/0167484 A1 Jul. 2, 2009

(51) Int. Cl.
*G05B 23/02* (2006.01)

(52) U.S. Cl.
USPC ........................................ 340/10.33; 340/3.31

(58) Field of Classification Search
CPC ............ G06K 7/0008; G06K 19/0723; G06K 19/0701
USPC ...................... 340/3.31, 3.1, 3.4, 10.1–10.52, 340/572.1–573.1
See application file for complete search history.

(56) References Cited

U.S. PATENT DOCUMENTS

| | | | | |
|---|---|---|---|---|
| 4,628,418 A * | 12/1986 | Chabria | ........................ | 362/116 |
| 6,172,466 B1 * | 1/2001 | Ki et al. | ........................ | 315/224 |
| 7,924,156 B2 * | 4/2011 | Colby | ........................ | 340/572.1 |
| 2004/0124741 A1 * | 7/2004 | Morrison et al. | ............ | 310/314 |
| 2006/0227669 A1 * | 10/2006 | Pennaz et al. | ................ | 368/327 |

* cited by examiner

*Primary Examiner* — Jennifer Mehmood
*Assistant Examiner* — Yong Hang Jiang
(74) *Attorney, Agent, or Firm* — Pillsbury Winthrop Shaw Pittman LLP

(57) ABSTRACT

An embodiment of the invention relates to a for remote control of an electrical circuit, comprising an RFID source, a remotely-mounted switch operatively coupled to an RFID tag, and an RFID receiver operatively coupled to an electrical circuit, wherein a change in state of the remotely-mounted switch is detected by the RFID tag and transmitted to the RFID receiver to control the electrical circuit.

11 Claims, 2 Drawing Sheets

RFID ENABLED LIGHT SWITCHES

RELATED APPLICATION

None.

FIELD OF INVENTION

Embodiments of the invention relate to apparatus, system and method for use of a power-scavenging receiver (e.g., RFID) to generate a signal to be used to report a status. The status further can be used to control an operational state.

BACKGROUND

Switches or sensors are sometimes required in locations where it is not desirable to provide a wired connection to the switches or sensors. For instance the placement of the switches or sensors may be temporary, or a wired connection may not be accessible, or a wired connection may not be desirable in the environment of the switch.

The embodiments of the invention relate to switches, sensors, and related methodology, whereby the switches or sensors may be placed in locations without use of a wired connection.

DETAILED DESCRIPTION

Figure 1:
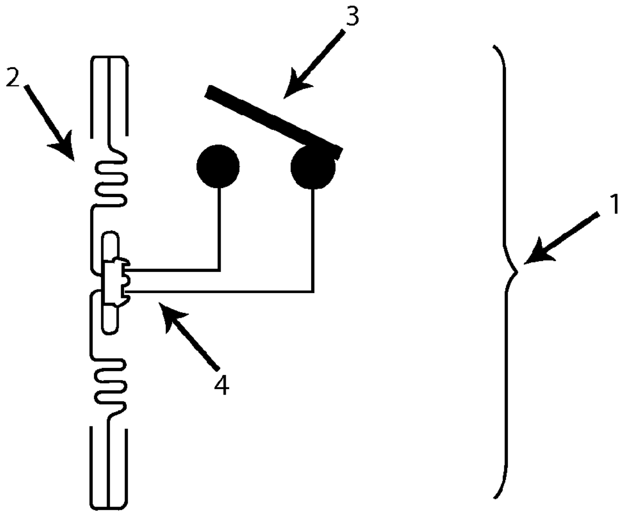
FIG. 1 shows a schematic of an RFID-enabled switch, according to an embodiment of the invention.

In the following description, numerous specific details are set forth. However, embodiments of the invention may be practiced without these specific details. In other instances, well-known circuits, structures and techniques have not been shown in detail in order not to obscure the understanding of this description.

Some uses of switches or sensors are in locations where it is not desirable to provide a wired connection of the switch to the circuit it controls, or of the sensor to the required power source to operate the sensor. For instance: (1) a switch or sensor location may be intended to be temporary and does not justify permanent wiring; (2) a switch or sensor may need to be provided more quickly than a wired connection can be provided; (3) it may be unduly disruptive to provide a wired connection, for instance for aesthetic reasons or risk of damage during installation; or (4) the risk of a spark may make a wired switch or sensor dangerous when environmental factors such as flammable vapors are present. For these applications, an RFID-enabled switch or sensor that is easy to place can provide an improved switch or sensor.

Radio Frequency Identification ("RFID") is a means of communication using radio frequency transmission. The technology can be used for instance to track, identify or interrogate objects. Communication takes place between a reader (e.g., interrogator) and a transponder often called an RFID tag ("tag"). In typical systems, tags are attached to objects.

The RFID tag typically includes the combination of an RFID tag circuit coupled to an RFID antenna. The RFID tag may simply transmit data, or may also perform various processing operations such as storing and/or reading data from a memory. Tags can either be actively powered by a battery or passively powered by harvesting energy from the reader field, and come in various forms. Each tag has a certain amount of internal memory, e.g., EEPROM, in which the tag stores information about the object, such as its unique ID number, date of manufacture, or product composition. When these tags pass through an electromagnetic field generated by a reader, the tags transmit this information back to the reader.

The communication frequencies used depends to a large extent on the application, and range generally from 125 KHz to 2.45 GHz, covering LF, HF, UHF and microwave ranges. Generally, higher RFID operating frequencies produce a greater range, faster read rate, smaller tag size, but lesser ability to communicate near metal or wet surfaces.

Regulations are imposed by most countries to control emissions and prevent interference with other equipment. The communication process between the reader and tag is managed and controlled by one of several protocols, such as the ISO 15693 and ISO 18000-3 for HF, or the ISO 18000-6 and EPC Generation 2 ("EPC") for UHF, as well as related documents. The ISO RFID standards and related documents will be referred herein collectively as ISO 18000. EPC refers to the specification document "EPC™ Radio-Frequency Identity Protocols/Class-1 Generation-2 UHF RFID/Protocol for Communication at 860 MHz-960 MHz."

Several classes of tags are defined in the art. Class 1 ("Identity Tag") is designed to be the lowest cost, minimal usable functionality tag classification. Identity Tags are purely passive RFID tags that only implement a resource discovery mechanism and store a unique object identifier. Class 2 ("Higher Functionality Tags") build upon the Identity Tag by providing more functionality, such as a tag identifier and read/write memory, while still maintaining a pure passive power and communication scheme. Class 3 ("Semi-Passive Tags") add an on-tag power source, such as a battery, to their class 2 foundation. Semi-Passive Tags combine passive communication with an on-tag power source that enables a tag to operate without the presence of a passive tag reader. Class 4 ("Active Ad-Hoc Tags") encompass the Class 3 tags and, in addition, are ad-hoc networking devices that are capable of communicating with other Class 4 tags using active communication, and with Class 5 Tags using both passive and active communication. Class 5 Reader Tags encompass the functionality of a Class 4 tag and, in addition, are able to power and communicate with purely passive Class 1 and Class 2 tags and communicate with Class 3 tags via passive communication.

Each RFID tag is designed to a specific protocol, which defines how the tag will communicate to the outside world. The reader and tag must be designed to the same protocol in order to communicate. The protocol includes features such as encryption, locking ability and anti-collision algorithms.

When the reader is switched on, it starts emitting a signal at a selected frequency. Any corresponding tags within range of the reader will detect the signal and use the energy from it (i.e., "harvest" the energy) to wake up and supply operating power to its internal circuits. Once the tag has decoded the signal as valid, the tag replies to the reader and indicates its presence by modulating the signal retransmitted from the tag and received by the reader. The retransmitted signal may also be referred herein as the reradiated signal.

If more than one tag is within range of the reader, they will all reply at the same time, which at the reader end is seen as a signal collision and an indication of multiple tags. The reader manages this problem by using one of the anti-collision algorithms that are well known to those skilled in the art.

The nature of RFID communications is such that the impinging RF energy within the RF signal provides sufficient power for the RFID receiver to operate, without any power drain from the device's battery (or other power source). Consequently, the RFID receiver may be operational only when the receiver falls within range of an RFID transmitter. In order to receive energy and communicate with a reader, passive tags use either: (1) the near field, which employs inductive coupling of the tag to the magnetic field produced by the reader antenna, and is generally used by tags operating at LF and HF frequencies; or (2) the far field, which uses techniques similar to radar backscatter reflection, by coupling with the electric field, and is generally used by tags at frequencies above HF. These methods are referred to as "harvesting" or "scavenging" the RFID power in order to power the tag and transmit information back to the RFID reader. Techniques for harvesting RFID power are known and described in U.S. patent application Ser. No. 10/956,995 by the Applicant, the entire content of which is hereby incorporated by reference in its entirety. application Ser. No. 10/956,995 further describes the integration and use of secondary electronics with RFID tags.

FIG. 1 shows an embodiment of the present invention, an RFID-enabled switch 1, wherein the RFID-enabled switch 1 is formed by a switch 3 operatively coupled to an RFID tag 2 by a coupling means 4, such that a change in state of the switch 3 is detected by the RFID tag 2. The mechanism of switch 3 may be of any type, for instance: a rocker switch; an electrostatic sensing surface (i.e., a touch sensitive surface); piezoelectric; photosensitive detector; dimmer; or thermal detector.

The switch may be a purely passive device, or it may have an active (i.e., powered) component. If the switch contains an active component, the switch may be powered either from power harvested by the RFID tag, or by an independent power source (e.g., a battery).

The coupling means 4 of the switch 3 to the RFID tag 2 may be physically implemented as a wired interface, or wireless interface such as Bluetooth (IEEE Standard 802.15.1), Zigbee (IEEE 802.15.4 standard), Ultra Wideband (UWB), or wireless USB.

The coupling means 4 of the switch 3 to the RFID tag 2 may be operably implemented such that the RFID tag 2 interrogates switch 3 directly to determine the state of switch 3, then produces a predetermined change in reradiated RFID energy transmitted by the RFID tag 2. For instance, the RFID tag 2 may be part of a polling system, wherein the RFID tag 2 responds to a polling signal by interrogating the switch position. Alternatively, a change in state of the switch 3 may cause a predetermined change to at least a portion of a memory accessible by the RFID tag 2. The RFID tag 2 may then read from the memory in order to produce a predetermined change in reradiated RFID energy transmitted by the RFID tag 2. The predetermined change in reradiated RFID energy is well known in the art and is described in the EPC and ISO 18000 specifications, and includes for instance a modulation that imparts the content of memory writable by the switch 3. Alternatively, a change in state of the switch 3 may cause a change in the state of the secondary electronics that is integrated into the RFID tag 2, which then produces a predetermined change in reradiated RFID energy. Examples of secondary electronics that may be integrated into the RFID tag 2 include: digital logic; analog logic; digital signal processor ("DSP"); microcontroller; microcomputer; a finite state machine; gate array logic; or any combination thereof.

Various physical arrangements are possible, for instance the RFID tag 2 may be embedded within the switch 3, or the switch 3 may be attached to the RFID tag 2, or the switch 3 may be separated from the RFID tag 2 if the coupling means 4 is a wireless interface. The conductive elements of RFID tag 2 may be visible from the outside of the RFID-enabled switch 1, or may be placed as to be not visible.

Figure 2:
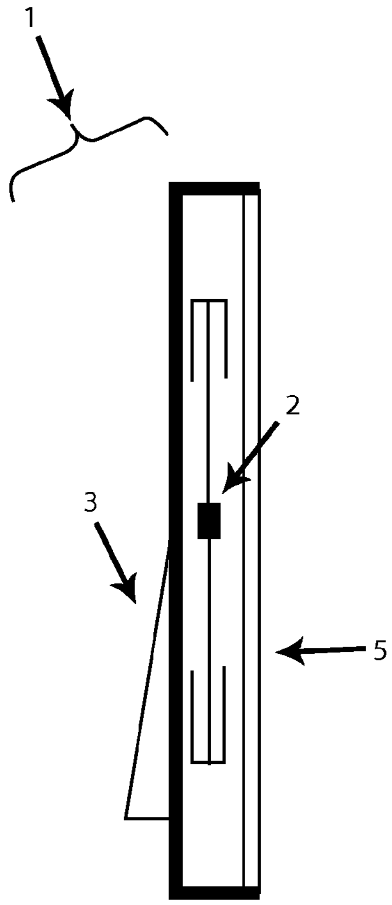
FIG. 2 shows a side view of an RFID-enabled switch together with a mounting means, according to an embodiment of the invention.

FIG. 2 shows a side view of an embodiment of the present invention, the RFID-enabled switch 1 in which a mounting means 5 is provided to attach the RFID-enabled switch 1 to an object. The mounting means 5 is preferably by an adhesive, thereby allowing a "peel and stick" placement. Other mounting means 5 are possible, for instance: screw(s); bolt(s); support wire(s); clamp(s); hook(s); electrostatic attraction; vacuum suction attraction to a flat surface; magnetic attraction; a holder in which the RFID-enabled switch is placed; or any combination thereof. If no mounting means 5 is provided, then the RFID-enabled switch 1 may be loosely placed on a support surface.

Figure 3:
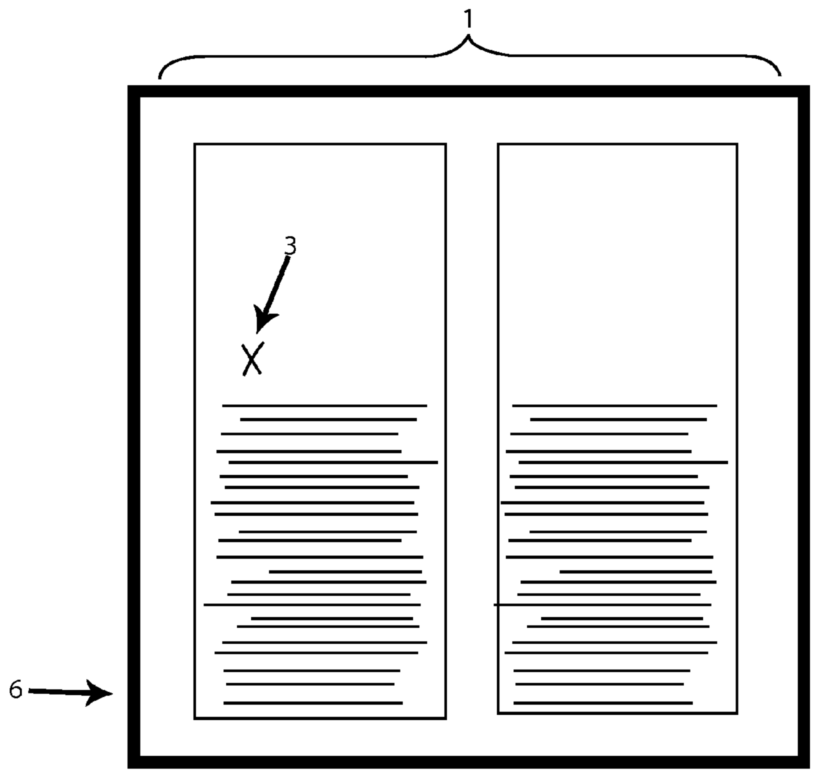
FIG. 3 shows a front view of an RFID-enabled switch, according to an embodiment of the invention.

FIG. 3 shows a front view of an embodiment of the present invention, the RFID-enabled switch 1 in which an enclosure 6 is provided around at least a portion of RFID-enabled switch 1. The enclosure 6 may be used to provide protection to the RFID-enabled switch 1 from its surrounding environment, for instance a waterproof enclosure 6, or an enclosure providing protection from particulates, or a hermetically sealed enclosure, or electromagnetic shielding.

Figure 4:
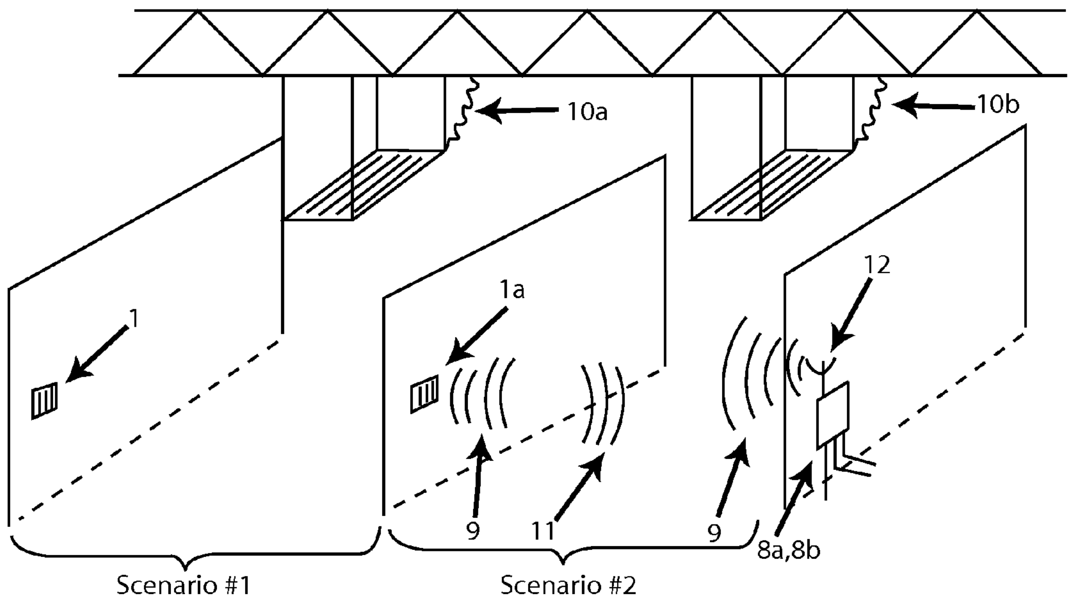
FIG. 4 shows an RFID-enabled remote control system, according to an embodiment of the invention.

FIG. 4 shows another embodiment of the present invention, a system for remote control, including an RFID source 8*a* coupled to an antenna 12, radiating RFID energy 9, an RFID-enabled switch 1 that receives the radiated RFID energy 9, the switch 3 within the RFID-enabled switch 1 having a plurality of states and operatively coupled to the RFID tag 2, an RFID reradiative source 1*a* transmitting reradiated RFID energy 11, wherein a change in the state of the switch 3 produces a predetermined change in the reradiated RFID energy 11, a remote receiver of reradiated RFID energy 8*b*, and means for controlling an electrical circuit 10*a*, 10*b* using the received reradiated energy 11, wherein a change in the state of the switch 3 produces a predetermined change in the electrical circuit 10*a* or 10*b*, for instance turning on or off or dimming.

Optionally, a mounting means 5 may be provided, wherein the mounting means is operable to mount the RFID-enabled switch 1 to an object. Any of the mounting means 5 for the RFID-enabled switch 1 embodiment is also selectable as the mounting means for the system for remote control.

Preferably, the RFID source 8*a* and reradiated RFID receiver 8*b* are integrated together using the same radiative elements, forming an RFID transceiver, and may include additional operational circuitry such as a processor and memory. Preferably, the RFID tag 2 within the RFID-enabled switch 1 also acts as the RFID reradiative source 1*a*, forming an RFID tag transceiver.

The means for controlling an electrical circuit using the received reradiated energy may include, for instance, a processor-controlled switch, wherein the processor detects the predetermined change in the reradiated RFID energy 11 that is indicative of a change in the state of the switch 2, and configuring the processor-controlled switch to a predetermined state, such as "on," "off" or "dimmed"; or the reradiated RFID receiver 8*b* may store a value derived from the state of switch 2 into memory that is accessible by the electrical circuit; or the reradiated RFID receiver 8*b* may generate an interrupt signal.

Another embodiment of the invention is a system for remote sensing, including an RFID source radiating RFID energy; an RFID tag that receives the radiated RFID energy;

a sensor, operatively coupled to the RFID tag, the sensor and RFID tag together forming an RFID-enabled sensor; an RFID reradiative source transmitting reradiated RFID energy, wherein a change in the state of the sensor produces a predetermined change in the reradiated RFID energy; a remote receiver of reradiated RFID energy; and means for controlling an electrical circuit using the received reradiated energy, wherein a change in the state of the sensor produces a predetermined change in the electrical circuit. Applications of a system for remote sensing are described in U.S. patent application Ser. No. 10/993,652 and U.S. patent application Ser. No. 10/993,758 by Applicant.

Optionally, a mounting means may be provided, wherein the mounting means is operable to mount the sensor to an object. Any of the mounting means for the RFID-enabled switch embodiment is also selectable as the mounting means for the system for remote sensing.

Preferably, the RFID source and reradiated RFID receiver of the system for remote sensing are integrated together using the same radiative elements, forming an RFID transceiver and may include additional operational circuitry such as a processor and memory. Preferably, the RFID tag within the RFID-enabled sensor also acts as the RFID reradiative source, forming an RFID tag transceiver.

The means for controlling an electrical circuit using the received reradiated energy in the system for remote sensing is the same as the means for controlling an electrical circuit using the received reradiated energy in the system for remote control.

The RFID transceiver **8*a*, 8*b* may share an antenna structure 12** with multi-protocol radio that may support, for example, one or more wireless network protocols and/or an RFID protocol. Mobile electronic device may further include a processor and/or memory. In one embodiment, a battery may provide power to the processor, memory and/or multi-protocol radio. In another embodiment, a battery may also provide power to an RFID transceiver in response to, for example, an interrupt signal generated by the RFID transceiver.

The switch 3 or sensor, which are operably connected to the RFID tag 2, may require power to operate. The primary power for the operational circuitry may be harvested from the RFID incident energy, or supplied by a battery, a main supply, or from other sources. If power is provided from a non-harvested source, then the electronic circuitry that the RFID transceiver communicates with or controls may remain powered up when the RFID transceiver is not active. This may include either the sensor(s), or the controlled electrical circuit(s). Continuous power may be desirable for circuits such as frequency stability circuits, in order to retain frequency accuracy or reduce power up time, regardless of the powered state of the remainder of the RFID circuit.

An application example is a measurement transducer, in which a temperature sensor may be a battery-powered circuit that makes measurements using an integrated temperature sensor and stores the data after each measurement in memory. After making each measurement the transducer may power down to conserve battery power. Asynchronously with these measurements, a worker may move around to the various sites where measurement transducers are located and use an RFID reader using RFID technologies to interrogate multiple devices. In one embodiment, the RFID signal received by the RFID transceiver may cause the measurement device to power up by activating an interrupt signal, or by other methods as previously discussed.

The techniques and devices described herein are more broadly applicable. For example, power-harvesting RFID tags may be used in conjunction with wired or wireless devices as well as disconnected computing devices. Any device that communicates with other devices via wired or wireless media may be referred to as connected devices. Disconnected computing devices are devices that have any level of computational power (e.g., a processor, a state machine) and may be disconnected from any other electronic device. An example of a disconnected device is a temperature transducer described in an example below.

This application discloses several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

The invention claimed is:

1. An apparatus comprising:

a dimmer switch communicatively coupled to an RFID tag via a wireless interface, the RFID tag configured to:

receive a polling signal from a RFID source;

interrogate, in response to the polling signal, the dimmer switch to determine a position of the dimmer switch;

receive through the wireless interface information indicative of the determined position of the dimmer switch; and transmit, based on the determined position of the dimmer switch, a wireless control signal to an electrical circuit.

2. The apparatus of claim 1, further comprising a memory accessible by the RFID tag, wherein a change in the position of the dimmer switch causes a predetermined change to at least a portion of the memory; and the RFID tag further configured to transmit, based on the predetermined change, the wireless control signal to the electrical circuit.

3. The apparatus of claim 1, wherein the RFID tag includes a digital signal processing circuit.

4. The apparatus of claim 3, wherein the reredaited signal is an interrupt signal.

5. The apparatus of claim 1, wherein the dimmer switch is mounted to an object.

6. A system for remote control, comprising:

a RFID source comprising:

a RF transceiver configured to transmit RF energy as part of a polling signal and configured to receive a RF response; and one or more processors electrically connected to an electrical circuit and configured to place the electrical circuit into an on state, an off state, a dimmed state, or any combination thereof based on the received RF response;

a RFID-enabled switch comprising:

a dimmer switch communicatively coupled to a passive RFID tag;

the passive RFID tag configured to:

receive the RF energy from the RFID source;

interrogate, in response to the polling signal, the dimmer switch to determine a position of the dimmer switch;

receive information indicative of the determined position of the dimmer switch; and transmit the RF response by reradiating the RF energy received from the RFID source, wherein the RFID response is based on determined position of the dimmer switch.

7. The system of claim 6, wherein the RFID-enabled switch further comprises an adhesive, screw, bolt, support, wire, clamp, hook, electrostatic attraction, vacuum suction attraction, a holder, or any combination thereof.

8. The system of claim 6, wherein the RFID source is further configured to transmit an interrupt signal to the electrical circuit based on the RF response received from the RFID-enabled switch.

9. A method for remote control, comprising:

receiving, at a RFID tag of a RFID-enabled switch, a polling signal from a RFID source;

interrogating, in response to the polling signal, a dimmer switch of the RFID-enabled switch to determine a position of the dimmer switch;

receiving, at the RFID tag, information indicative of the determined position of the dimmer switch; and transmitting a wireless control signal based on the determined position of the dimmer switch.

10. The method of claim 9, further comprising mounting the dimmer switch to an object by a means selected from the group consisting of adhesive, screw, bolt, support wire, clamp, hook, electrostatic attraction, vacuum suction attraction, and a holder.

11. The method of claim 10, wherein the wireless control signal comprises an interrupt signal.

* * * * *